United States Patent
Brauer et al.

(12)

(10) Patent No.: US 6,758,477 B2
(45) Date of Patent: Jul. 6, 2004

(54) ASPIRATING FACE SEAL WITH AXIALLY BIASING ONE PIECE ANNULAR SPRING

(75) Inventors: John C. Brauer, Lawrenceburg, IN (US); Robert J. Albers, Park Hills, KY (US)

(73) Assignee: General Electric Company, Schenectady, NY (US)

( * ) Notice: Subject to any disclaimer, the term of this patent is extended or adjusted under 35 U.S.C. 154(b) by 130 days.

(21) Appl. No.: 10/106,759

(22) Filed: Mar. 26, 2002

(65) Prior Publication Data

US 2003/0184022 A1 Oct. 2, 2003

(51) Int. Cl.[7] ................................................. F01D 11/02
(52) U.S. Cl. ........................................ 277/409; 277/379
(58) Field of Search ................................. 277/409, 377, 277/379, 385, 411, 384

(56) References Cited

U.S. PATENT DOCUMENTS

| | | |
|---|---|---|
| 4,211,424 A | 7/1980 | Stein |
| 4,306,652 A * | 12/1981 | Inaba .......................... 206/305 |
| 4,477,088 A | 10/1984 | Picard |
| 5,048,636 A | 9/1991 | Roehrs |
| 5,088,890 A | 2/1992 | Jewess |
| 5,174,584 A | 12/1992 | Lahrman |
| 5,284,347 A | 2/1994 | Pope |
| 5,311,734 A | 5/1994 | Pope |
| 5,575,486 A | 11/1996 | Edling et al. |
| 5,769,604 A | 6/1998 | Gardner et al. |
| 5,975,537 A | 11/1999 | Turnquist et al. |
| 6,050,079 A | 4/2000 | Durgin et al. |
| 6,134,877 A | 10/2000 | Alkabie |
| 6,145,840 A * | 11/2000 | Pope .......................... 277/348 |
| 6,254,071 B1 | 7/2001 | Greenhill |
| 6,322,079 B1 | 11/2001 | Mullaney, III |
| 6,325,380 B1 | 12/2001 | Feigl et al. |

\* cited by examiner

*Primary Examiner*—William L. Miller
(74) *Attorney, Agent, or Firm*—William Scott Andes; Steven J. Rosen

(57) ABSTRACT

A gas turbine engine aspirating face seal includes rotatable and non-rotatable engine members and a leakage path therebetween. Annular generally planar rotatable and non-rotatable gas bearing face surfaces are operably associated with the rotatable and non-rotatable engine members respectively and are circumscribed about and generally perpendicular to a centerline axis. A substantially fully annular pull off biasing element is operably disposed for urging the non-rotatable gas bearing face surface axially away from the rotatable gas bearing face surface and circumscribed about the centerline axis. The pull off biasing element may be at least one wave spring or one bellville washer. The non-rotatable gas bearing face surface may be on a face seal ring mounted on a translatable cylindrical piston which is axially movable and supported by the non-rotatable engine member.

18 Claims, 6 Drawing Sheets

ASPIRATING FACE SEAL WITH AXIALLY BIASING ONE PIECE ANNULAR SPRING

BACKGROUND OF THE INVENTION

The present invention relates generally to aspirating face seals for rotor and stator assemblies and, more particularly, to rotatable and non-rotatable gas bearing face surfaces of aspirating face seals with pull off springs to retract the non-rotatable gas bearing face surface away from the rotatable gas bearing face surface during periods of low pressure differentials across the seal.

Aspirating face seals are used to minimize leakage through a gap between two components and from a higher pressure area to a lower pressure area. Such seals have been disclosed for use in rotating machinery, including, but not limited to, turbomachinery such as gas turbine engines used for power generation and for aircraft and marine propulsion. Aspirating face seals are designed to minimize leakage of a fluid such compressed air or combustion gases between a rotor and a stator in gas turbine engines.

Conventional aspirating face seals typically have the rotor configured as oppositely facing rotatable and non-rotatable seal elements, with the rotatable seal element either being attached to, or being a monolithic portion of the rotor. Such seals typically have the non-rotatable seal element configured being axially movably attached to a portion of the stator. The rotatable and non-rotatable seal elements are generally annular, generally perpendicular to the longitudinal axis of the rotor, generally opposing, axially spaced apart, and proximate each other.

Typically, the first rotatable and non-rotatable elements together define a radially extending air bearing and a radially extending air dam positioned radially inward of the air bearing. An air bearing surface of the first element and an air dam surface of the first element generally lie in the same plane. The air bearing surface of the second element has a hole which is an outlet for a first passageway connecting the hole with air from a higher pressure side of the seal. The stator has a second passageway which carries air, which has passed the air dam from the higher pressure side of the seal, to a lower pressure side of the seal. Known seal designs have also included an aspirator tooth extending from the stator axially across, and radially inward of, the air dam, with the aspirator tooth having a tip spaced apart from and proximate the rotor. It is also important to note that aspirating face seal technology uses phrases such as "air bearing", "air dam", and "air flow", wherein it is understood that the word "air" is used to describe the working fluid of the seal. The working fluid of an aspirating face seal can include, without limitation, compressed air, combustion gases, and/or steam. Reference may be had to U.S. Pat. Nos. 5,311,734 and 5,975,537 for more details on aspirating face seals and their operation.

Many aspirating face seals use multiple coil springs positioned circumferentially around a portion of the stator for urging the non-rotatable seal element and its non-rotatable gas bearing surface away from the rotatable seal element and its rotatable gas bearing surface when the engine is not running or when the pressure differential across the aspirating seal is low. The multiple spring concept includes many non-axisymetric parts which are exposed to the severe operating environment of a gas turbine engine. This includes significant dust which at high velocity can quickly erode away the material of interrupted features like coil springs. Some seals do not use springs and may allow rubbing of the rotor and stator elements each time the engine is started causing premature part wear out.

It is important to note that an aspirating face seal is a non-contacting seal in that the first and second parts of the seal are not suppose to touch but could for short periods of time during which they experience what are known as rubs. Aspirating face seals generate significant heat and/or scratch rotor surfaces when seal rubs occur. It is, thus, desirable to minimize heat input into the rotating component and maintain a smooth surface flush. Excessive heat input into the rotor component can result in material degradation which in turn can lead to premature component crack initiation. A rough surface finish could result in excessive seal leakage and create a stress riser, which could also cause premature component crack initiation.

BRIEF DESCRIPTION OF THE INVENTION

A gas turbine engine aspirating face seal includes a rotatable engine member and a non-rotatable engine member and a leakage path therebetween. An annular generally planar non-rotatable gas bearing face surface is operably associated with the non-rotatable engine member and an annular generally planar rotatable gas bearing face surface is operably associated with the rotatable engine member. The non-rotatable and rotatable gas bearing face surfaces is circumscribed about and generally perpendicular to a centerline axis. A substantially fully annular pull off biasing means is operably disposed for urging the non-rotatable gas bearing face surface axially away from the rotatable gas bearing face surface and circumscribed about the centerline axis. The pull off biasing means may be at least one wave spring or one bellville washer. The non-rotatable gas bearing face surface may be on a face seal ring mounted on a translatable cylindrical piston which is axially movable and supported by the non-rotatable engine member. The spring chamber may be formed in part by radially extending static and axially movable flanges attached to a face seal support structure and the translatable cylindrical piston respectively, wherein the face seal support structure is supported by the non-rotatable engine member. The rotatable engine member may be a rotor disk or, in a more particular embodiment, the rotatable engine member is a side plate mounted on a rotor disk and the non-rotatable gas bearing face surface is on a face seal ring mounted on a translatable cylindrical piston which is axially movable and supported by the non-rotatable engine member.

The seal may further include an auxiliary seal having a restrictor tooth radially spaced apart from and proximate to a seal land disposed between the rotatable engine member and non-rotatable engine member. More particularly, the seal may further include an auxiliary seal disposed across the leakage path radially inwardly of the gas bearing face surfaces. The auxiliary seal may include an annular restrictor tooth radially spaced apart from and proximate to an annular seal land having an annular auxiliary seal surface circumscribed around the engine centerline axis.

The seal may include radially inner and outer tooth rings axially extending away from a first one of the gas bearing face surfaces across the leakage path and towards a second one of the gas bearing face surfaces. An annular plenum is located between the inner and outer tooth rings and a portion of the first gas bearing face surface between the inner and outer tooth rings. Alternatively, the seal may include a primary restrictor dam radially spaced apart from the non-rotatable gas bearing face surface by an annular vent channel.

DETAILED DESCRIPTION OF THE INVENTION

Figure 1:
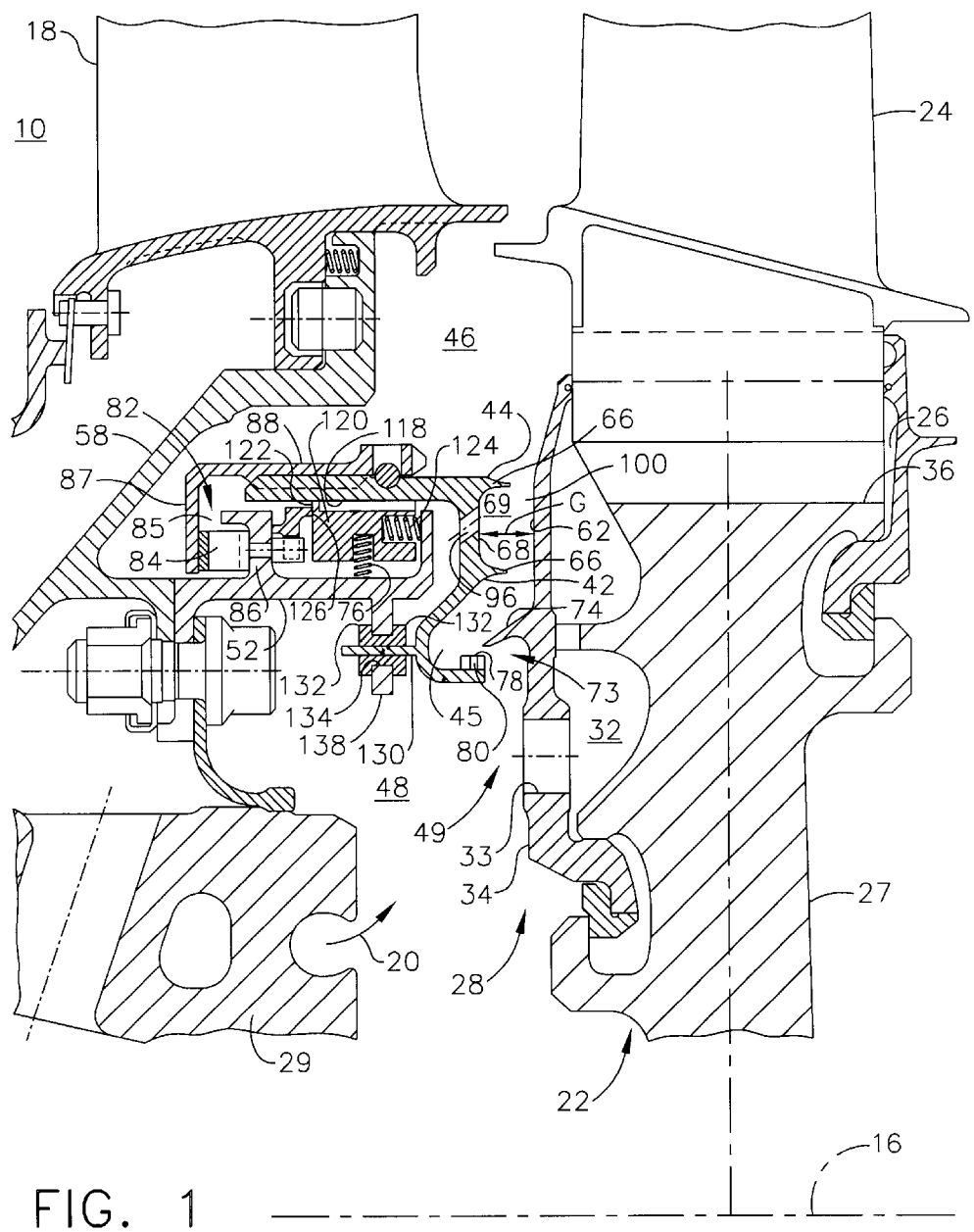
FIG. 1 is a cross-sectional view illustration of a portion of an exemplary gas turbine engine high pressure turbine and an aspirating gas bearing face seal with axially extending teeth and a first exemplary embodiment of a one piece annular pull off wave spring.

Illustrated in FIG. 1 is a portion of a gas turbine engine including a combustor 10 and a high pressure turbine 14 circumscribed around an engine centerline axis 16. The high pressure turbine 14 includes a static turbine nozzle 18 and a rotatable turbine stage 22 having coolable turbine blades 24 mounted on a rim 26 of a rotor disk 27 of the turbine stage 22. A portion of high pressure compressor discharge air 20 not burned in a combustor of the engine is directed from a relatively stationary inducer 29 to air cooling passages 32 in the rotatable rotor disk 27 for cooling blades 24. The cooling passages 32 are axially and circumferentially bounded by a side plate 34 which also helps retain the blades 24 in slots 36 in the rim 26 of the rotor disk 27. Compressor discharge air 20 is directed by the inducer 29 across a high pressure region 48 through apertures 33 in the side plate 34 to the air cooling passages 32.

An aspirating face seal 40 is used to restrict leakage of the high pressure compressor discharge air 20 from the relatively high pressure region 48 to a relatively low pressure region 46 at the juncture 49 between an rotatable engine member exemplified by the rotor disk 27 and a non-rotatable engine member structure 58. The non-rotatable engine 58 depends from the turbine nozzle 18 and supports the inducer 29. The face seal 40 includes a leakage path 45 between rotatable and non-rotatable engine members and between a rotatable and non-rotatable gas bearing face surfaces 62 and 68 of the seal 40. The rotatable and non-rotatable gas bearing face surfaces 62 and 68 are circumscribed around and generally perpendicular to the engine centerline axis 16. Non-rotatable is defined as not rotating with the rotor disk 27 or other parts of an engine rotor during engine operation.

Illustrated in FIG. 1 is a first exemplary embodiment of the face seal 40 of the present invention having a substantially fully annular pull off biasing means 82 circumscribed about the centerline axis 16 and operably disposed for urging the non-rotatable gas bearing face surface 68 axially away from the rotatable gas bearing face surface 62 of the seal 40 when the engine is not running and/or when the pressures in the high and low pressure regions 48 and 46 are substantially equal. The term pull off is used because the biasing means 82 is used for urging the non-rotatable gas bearing face surface 68 away from the rotatable gas bearing face surface 62.

Figure 2:
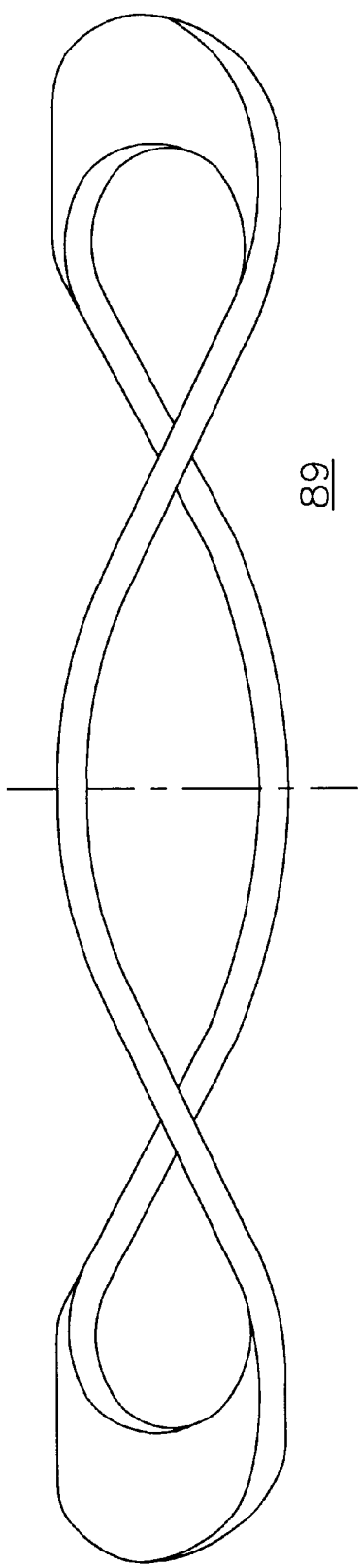
FIG. 2 is a perspective view illustration of a single wrap wave spring in FIG. 1.
Figure 4:
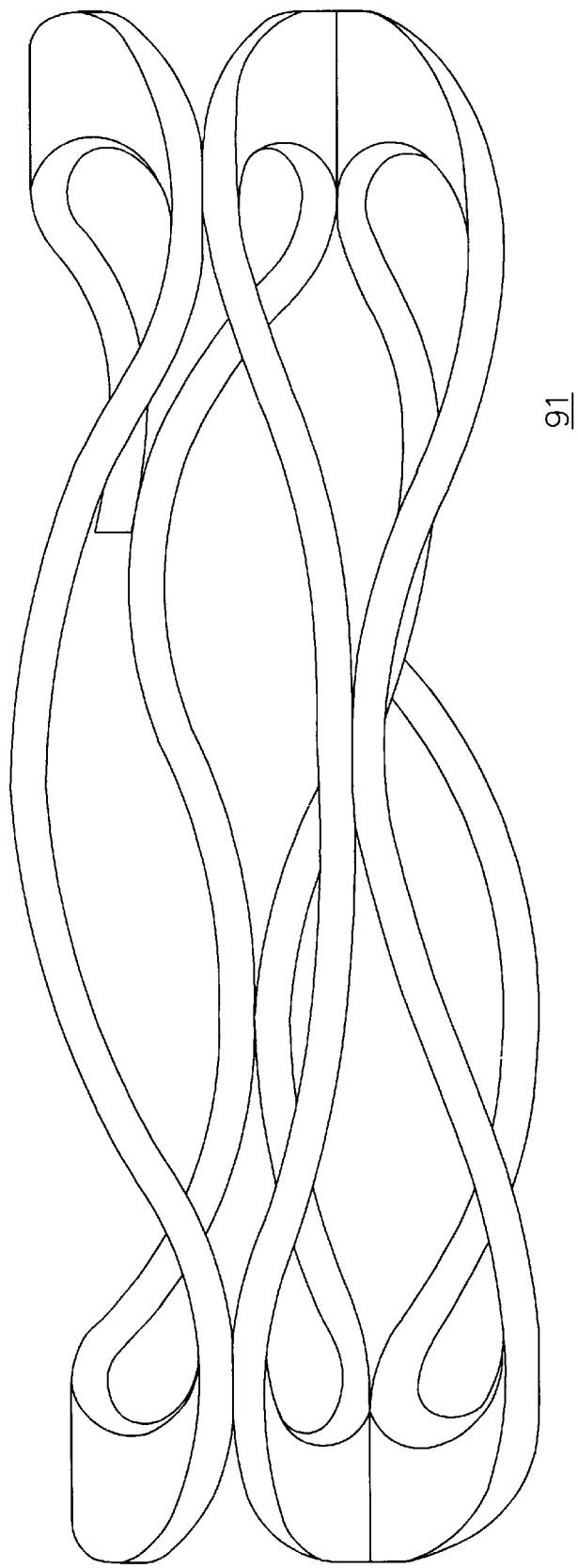
FIG. 4 is a perspective view illustration of double wrap wave spring.
Figure 6:
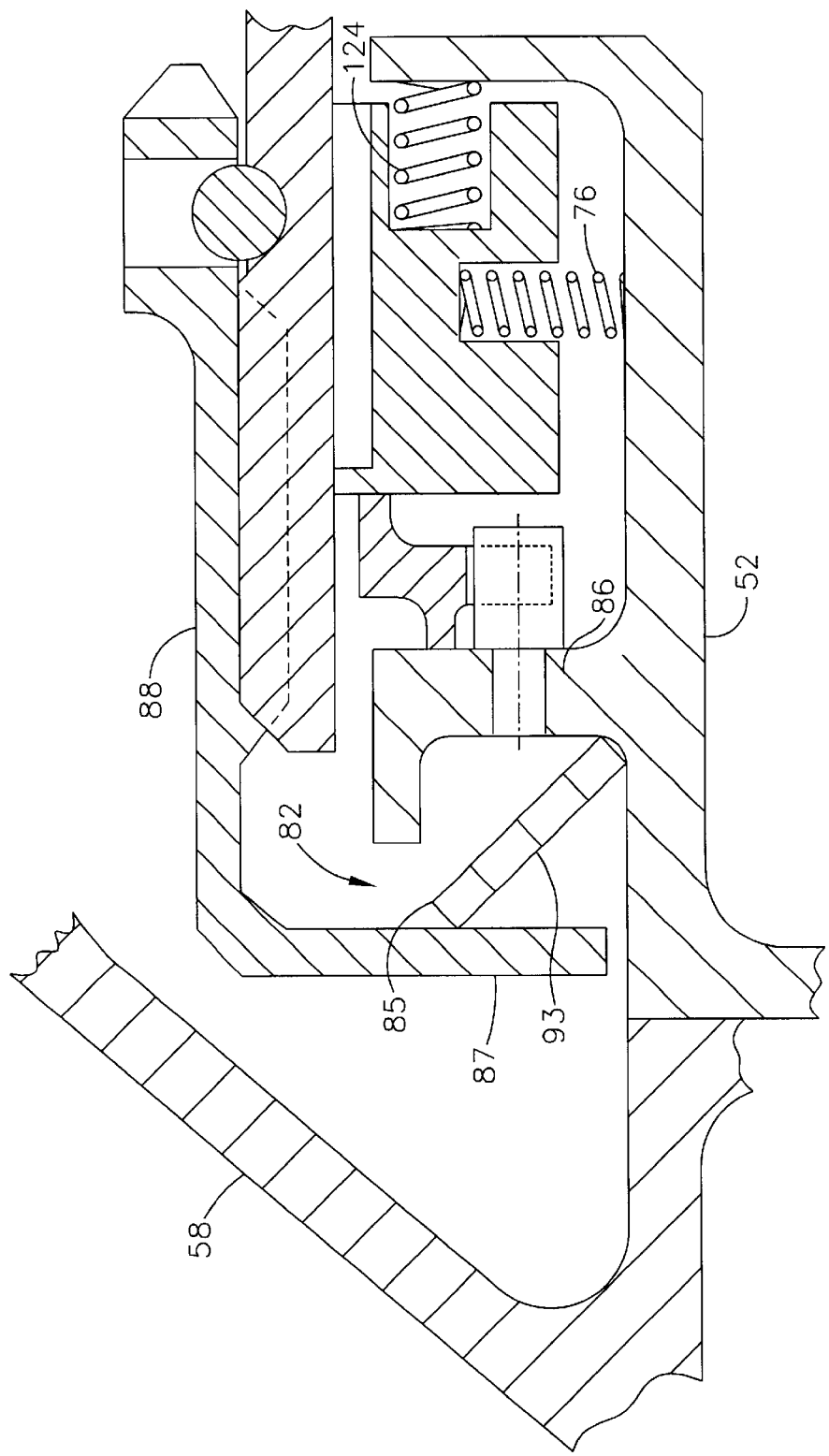
FIG. 6 is a cross-sectional view illustration of the aspirating gas bearing face seal with a pull off bellville washer.

The annular pull off biasing means 82 is illustrated in FIG. 1 as a pull off wave spring 84 (also known as a cockle spring) disposed within a continuous annular spring chamber 85 formed in part between radially extending static and axially movable flanges 86 and 87 attached to the face seal support structure 52 and a translatable cylindrical piston 88 respectively. The wave spring 84 may be a single wrap wave spring as illustrated in FIG. 2 or a multiple wrap wave spring as illustrated by a double wrap wave spring 91 in FIG. 4. Other alternative annular pull off biasing means 82 include, but are not restricted to, wave or wavy washers and bellville washers 93 which is illustrated in FIG. 6. More than one spring or washer may be disposed in the spring chamber 85. The substantially fully annular pull off biasing means 82 uses one or two springs or their equivalent that are unitary or one piece as opposed to the use of the multiple spring coil spring design that has many more parts both springs and coil spring chambers. The present invention has less parts, is therefore cheaper to construct, and is less susceptible to erosion due to dust at a high velocity.

The face seal 40 is designed to restrict leakage of the high pressure compressor discharge air 20 through the leakage path 45 from the relatively high pressure region 48 to the relatively low pressure region 46 at the juncture 49 between the rotatable turbine stage 22 and the non-rotatable engine member 58. The exemplary seal 40 illustrated in FIG. 1 has non-rotatable annular radially inner and outer axially extending tooth rings 42 and 44 extend axially away from the non-rotatable gas bearing face surface 68 towards the rotatable gas bearing face surface 62 on the side plate 34. In alternate embodiments, the annular radially inner and outer axially extending tooth rings 42 and 44 may be rotatable and extend axially away from the rotatable gas bearing face surface 62 towards the non-rotatable gas bearing face surface 68.

A face seal ring 60 is mounted on the non-rotatable axially translatable cylindrical piston 88 which is axially movably supported on a non-rotatable face seal support structure 52 attached to the non-rotatable engine member. The face seal support structure 52 is fixed with respect to and supported by the non-rotatable engine member 58. Circumferentially spaced apart guide and support pins 130 extend aftwardly from the face seal ring 60 through bushings 132 disposed in pin receiving holes 134 extending through guide and support pin flanges 138 mounted on the face seal support structure 52 forming a guide and support assembly. The guide and support assembly helps to radially support and axially guide the face seal ring 60.

The radially inner and outer axially extending tooth rings 42 and 44 are mounted on the face seal ring 60 and extend radially outward from the axially facing generally planar non-rotatable gas bearing face surface 68 towards the axially facing generally planar rotatable substantially planar gas bearing face surface 62. The face seal ring 60 is supported for axial movement with respect to the rotatable gas bearing face surface 62 which is on the side plate 34 that is mounted to the rotor disk 27. The radially inner and outer tooth rings 42 and 44 provide for low heat input into the rotatable component which is exemplified herein as the side plate 34 and the rotor disk 27 to which it is mounted. The radially inner and outer tooth rings 42 and 44 help maintain a smooth rotor surface finish which is exemplified herein as the rotatable gas bearing face surface 62.

An annular plenum 69 is bounded by the inner and outer tooth rings 42 and 44 and the non-rotatable gas bearing face surface 68 radially extending between the inner and outer tooth rings 42 and 44. The inner and outer tooth rings 42 and 44 extend axially towards the rotatable gas bearing face surface 62 on the side plate 34 and have pointed ends 66 proximate to the rotatable gas bearing face surface 62. A plurality of circumferentially spaced apart vent passages 96 through the face seal ring 60 provide pressure communication between the plenum 69 and low pressure region 46. The vent passages 96 vent the plenum 69 with low pressure air from the low pressure region 46 therein during engine operation when there is a substantial pressure differential between high and low pressure regions 48 and 46. An axial gap G is defined between the non-rotatable gas bearing face surface 68 and the rotatable gas bearing face surface 62.

An annular auxiliary seal 73 is also used to restrict airflow across the leakage path 45 and to create sufficient pressure, when the engine is operating, to urge the face seal ring 60 towards the rotatable gas bearing face surface 62. The auxiliary seal 73 includes an annular restrictor tooth 74 extending radially across the leakage path 45 towards an annular seal land 80 having an annular auxiliary seal surface 78. A radial gap H is defined between the annular restrictor tooth 74 and the auxiliary seal surface 78. The restrictor tooth 74 is radially spaced apart from and proximate the annular seal land 80. The annular restrictor tooth 74 and annular seal land 80 are circumscribed around the engine centerline axis 16. In the exemplary embodiment of the invention illustrated in FIG. 1, the restrictor tooth 74 is attached to the rotatable side plate 34 and the seal land 80 having the auxiliary seal surface 78 is attached to the face seal ring 60.

The face seal ring 60 is designed to translate between axial retracted and sealing positions RP and SP respectively as measured at the non-rotatable gas bearing face surface 68, denoted by arrows marked accordingly, as a result of forces acting on the face seal ring 60. The face seal ring 60 is illustrated in its sealing position in the FIGS. The forces are the result of pressures in the relatively low and high pressure regions 46 and 48 acting on surfaces and spring forces of the biasing or biasing means 82. When the engine is running and the face seal ring 60 is in the sealing position SP and there is an operational clearance C between the pointed ends 66 of the inner and outer tooth rings 42 and 44 and the rotatable gas bearing face surface 62. In one exemplary embodiment of the invention, when the face seal ring 60 in the sealing position SP, the axial gap G is about 25 mils (0.025 inches), the radial gap H is about 100–150 mils (0.1–0.15 inches), and the operational clearance C is about 1–8 mils (0.001–0.008 inches). In such an exemplary embodiment, a radius midway between the inner and outer tooth rings 42 and 44 to the engine centerline axis 16 may be about 10 inches.

The face seals of the present invention avoid significant amounts of heating and scratching of the rotor surfaces when seal rubs occur. Thus, reducing heat input into the rotating components and maintaining a smooth surface finish of the rotating seal surface. This reduces the possibility of material degradation and premature component crack initiation. A coating could be applied to the inner and outer tooth rings 42 and 44, also referred to as rotor axial seal teeth, to further minimize heat input into the rotor part, exemplified herein as the side plate 34 and the rotor disk 27 to which it is mounted. Another coating could be applied to the static part to minims heat generation and protect the parent material of the static part from scratches.

During low or no power conditions the face seal ring 60 and the inner and outer tooth rings 42 and 44 are biased away from the rotatable gas bearing face surface 62 by the biasing means 82. During higher power operation, the restrictor tooth 74 restricts the discharge air 20 flowing from the relatively high pressure region 48 to the relatively low pressure region 46 thereby causing a pressure differential between high and low pressure regions 48 and 46. The pressure differential between high and low pressure regions 48 and 46 acts on the face seal ring 60 and urges the face seal ring 60 and the inner and outer tooth rings 42 and 44 and tooth toward the rotatable gas bearing face surface 62.

A portion of the high pressure discharge air 20 is supplied to a gas bearing space 100, which includes the annular plenum 69, between the face seal ring 60 and the rotatable gas bearing face surface 62 through the vent passages 96 in the face sealing ring to establish a predetermined gas bearing face clearance. Pressure forces developed in the gas bearing space 100 oppose further motion of the face seal ring 60 and the inner and outer tooth rings 42 and 44 toward the rotatable gas bearing face surface 62. Accelerations and other motion of the face seal ring 60 and the inner and outer tooth rings 42 and 44 towards the rotatable gas bearing face surface 62 increases the pressure forces in the gas bearing space 100, thereby urging the face seal ring away from the rotatable gas bearing face surface to maintain the predetermined clearance.

As the engine is started, the compressor discharge pressure rises and the pressure in the high pressure region 48 begins to rise because the restrictor tooth 74 restricts the discharge air 20 flowing from the relatively high pressure region 48 to the relatively low pressure region 46. The pressure differential between the low and high pressure regions 46 and 48 results in a closing pressure force acting on face seal ring 60. The pressure force acts against a spring force from the biasing means 82 to urge face seal ring 60 and the inner and outer tooth rings 42 and 44 toward the rotatable gas bearing face surface 62.

As face seal ring 60 reaches the sealing position SP, the axial gap G becomes much smaller than the radial gap H, the pressure drop across the restrictor tooth 74 is insubstantial and airflow caused by the pressure drop between the low and high pressure regions 46 and 48 occurs substantially across gap between the face seal ring 60 and the inner and outer tooth rings 42 and 44 and the rotatable gas bearing face surface 62. Thus, gas bearing forces are developed at the non-rotatable gas bearing face surface 68 and the rotatable gas bearing face surface 62 which, acting with the spring force, balance the closing force and maintain the operational clearance C between the pointed ends 66 of the inner and outer tooth rings 42 and 44 and the rotatable gas bearing face surface 62 at a predetermined size.

A secondary seal means, such as a circumferentially extending split piston ring secondary seal 120, is provided to allow the face seal ring 60 to translate axially in response to the motions of the rotating surface on the rotor. The piston ring secondary seal 120 is urged radially inwardly by spring means, such as second coil springs 76, against a radially inwardly facing annular inner surface 118 of the face seal ring 60. A circumferentially extending secondary seal dam 122 on the piston ring secondary seal 120 is urged into radial sealing engagement with the inner surface 118. The piston ring secondary seal 120 is urged axially by a third spring means, such as by a plurality of circumferentially spaced third coil springs 124, into engagement with an axially facing substantially planar sealing surface 126 on the face seal support structure 52.

Figure 3:
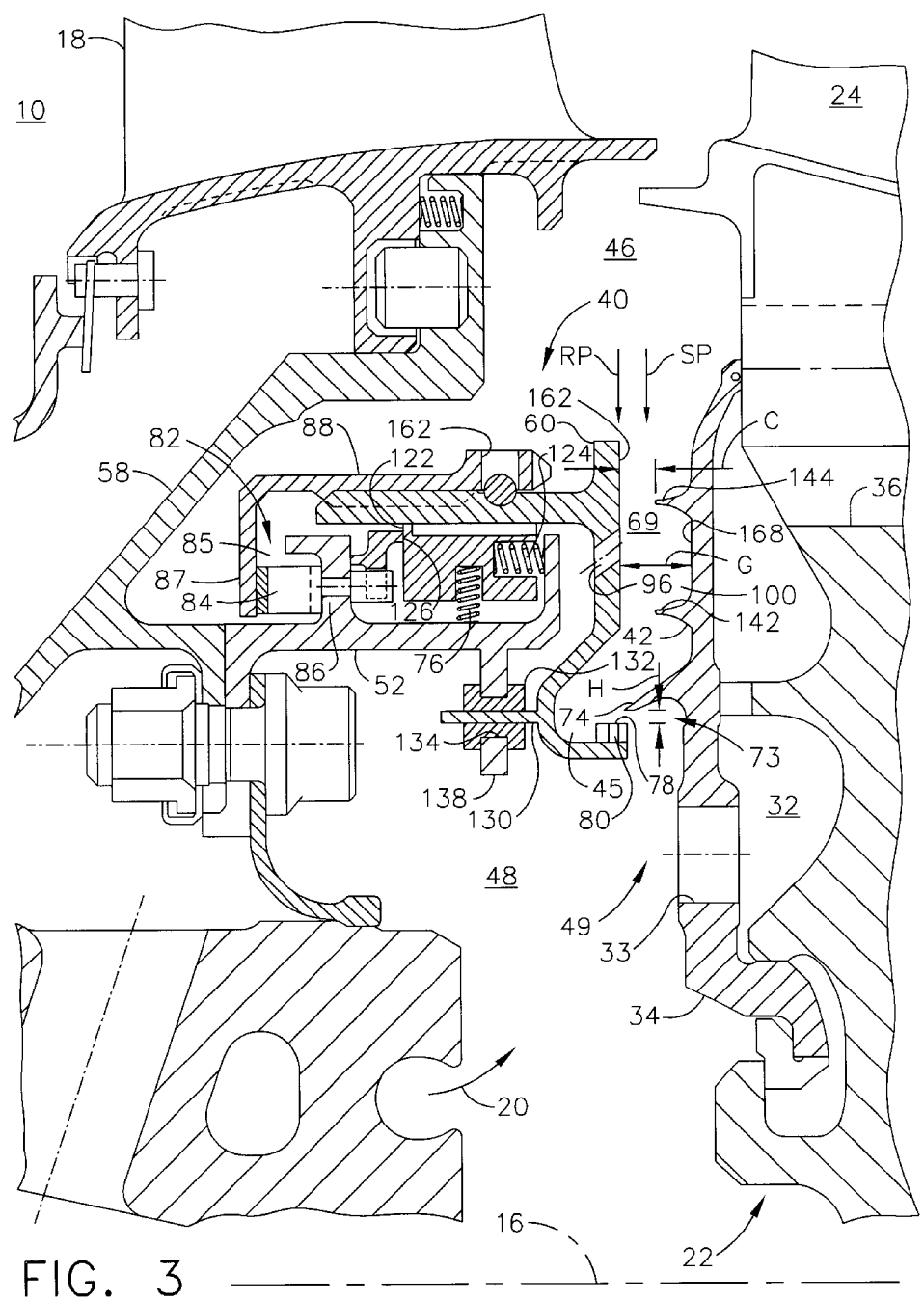
FIG. 3 is a cross-sectional view illustration of a portion of an exemplary gas turbine engine high pressure turbine and a second exemplary embodiment of a gas bearing face seal with rotatable axially extending teeth.

Illustrated in FIG. 3 is a second exemplary embodiment of a face seal 40 of the present invention having axially extending annular radially inner and outer rotatable tooth rings 142 and 144 mounted on the side plate 34 which is attached to the rotatable turbine stage 22. The rotatable tooth rings 142 and 144 are engagable with a substantially planar non-rotatable gas bearing face surface 168. The face seal ring 60 includes the non-rotatable gas bearing face surface 168 and is mounted on the translatable cylindrical piston 88 which is axially movably supported on the non-rotatable face seal support structure 52. The inner and outer rotatable tooth rings 142 and 144 extend axially from the rotatable gas bearing face surface 162 towards and have teeth which are proximate the non-rotatable gas bearing face surface 168. The face seal ring 60 containing the non-rotatable gas bearing face surface 168 is supported for axial movement with respect to the inner and outer rotatable tooth rings 142 and 144 on the side plate 34 which is attached to the rotor disk 27. The annular restrictor tooth 74 is attached to the face seal ring 60 and the auxiliary seal surface 78 and the seal land 80 are attached to the rotatable side plate 34.

Figure 5:
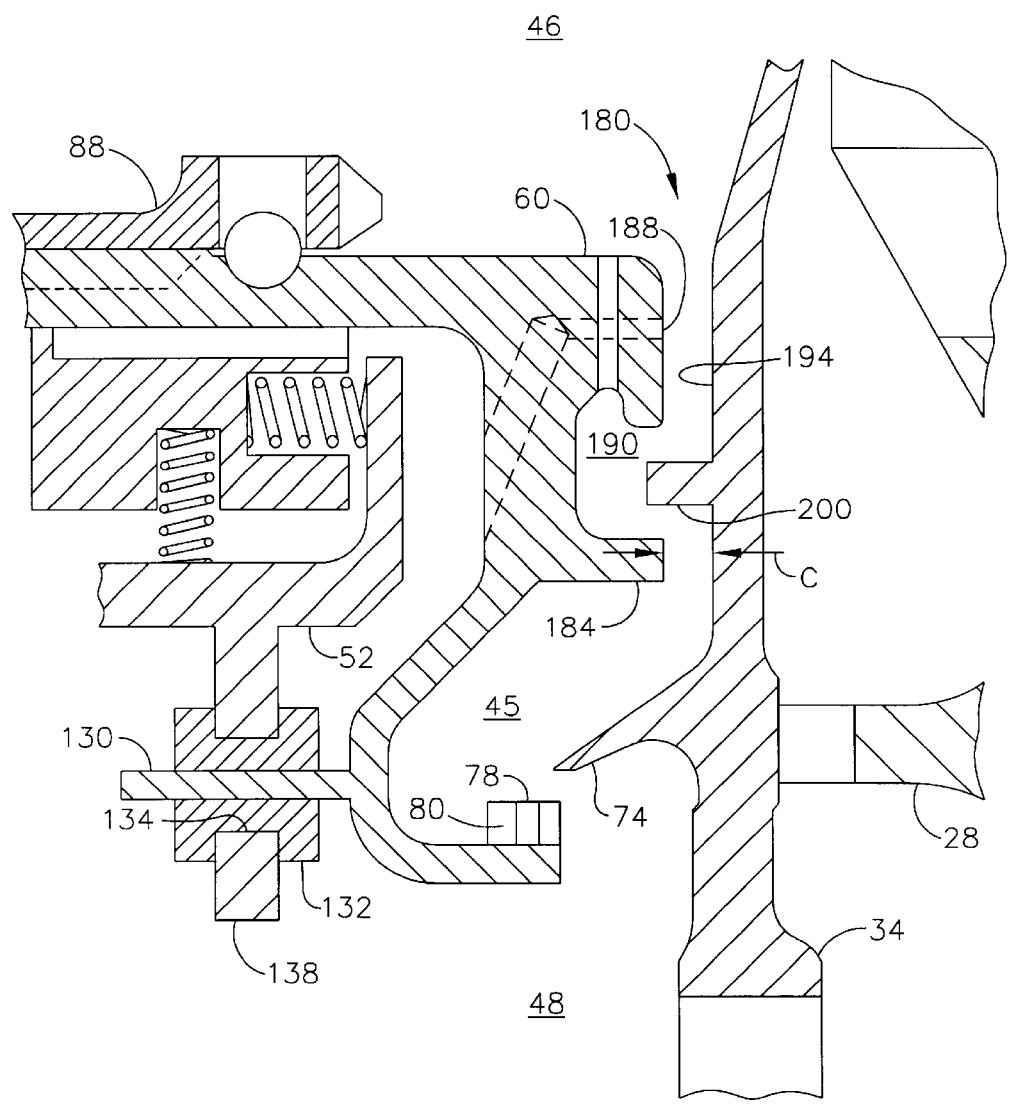
FIG. 5 is a cross-sectional view illustration of a portion of an exemplary gas bearing face seal as illustrated in FIG. 1 without axially extending teeth.

Illustrated in FIG. 5 is a third exemplary embodiment of an aspirating face seal 180 of the present invention. The face seal ring 60 includes a primary restrictor dam 184 radially spaced apart from a substantially planar non-rotatable gas bearing face surface 188 by an annular vent channel 190. The segmented channel resembles circumferentially distributed pockets. The non-rotatable gas bearing face surface 188 is proximate to a rotatable gas bearing face surface 194 and the seal 180 is designed to operate with an operational clearance C therebetween during engine operation. An annular deflector 200 extends radially from the rotatable gas bearing face surface 194 towards the annular vent channel 190 and may extend slightly into the vent channel. The deflector 200 prevents a strong airflow or jet from developing across the rotatable gas bearing face surface 194 due to a large differential pressure between the relatively low and high pressure regions 46 and 48. Such a high speed flow or jet could produce a sufficient pressure drop so as to cause the non-rotatable gas bearing face surface 188 to be sucked towards and into the rotatable gas bearing face surface 194.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention. Accordingly, what is desired to be secured by Letters Patent of the United States is the invention as defined and differentiated in the following claims.

What is claimed is:

1. A gas turbine engine aspirating face seal comprising:
   a rotatable engine member and a non-rotatable engine member and a leakage path therebetween,
   an annular generally planar non-rotatable gas bearing face surface operably associated with said non-rotatable engine member,
   an annular generally planar rotatable gas bearing face surface operably associated with said rotatable engine member,
   said non-rotatable and rotatable gas bearing face surfaces being circumscribed about and generally perpendicular to a centerline axis,
   a substantially fully annular pull off biasing means operably disposed for urging said non-rotatable gas bearing face surface axially away from said rotatable gas bearing face surface and circumscribed about said centerline axis, and
   said pull off biasing means including at least one wave spring or one belleville washer circumscribed about said centerline axis.

2. A seal as claimed in claim 1 wherein non-rotatable gas bearing face surface is on a face seal ring mounted on a translatable cylindrical piston which is axially movable and supported by said non-rotatable engine member.

3. A seal as claimed in claim 2 wherein said at least one wave spring or one belleville washer is disposed within a continuous annular spring chamber formed in part by radially extending static and axially movable flanges attached to a face seal support structure and said translatable cylindrical piston respectively wherein said face seal support structure is supported by said non-rotatable engine member.

4. A gas turbine engine aspirating face seal comprising:
   a rotatable engine member and a non-rotatable engine member and a leakage path therebetween,
   an annular generally planar non-rotatable gas bearing face surface operably associated with said non-rotatable engine member,
   an annular generally planar rotatable gas bearing face surface operably associated with said rotatable engine member,
   said non-rotatable and rotatable gas bearing face surfaces being circumscribed about and generally perpendicular to a centerline axis,
   a substantially fully annular pull off biasing means operably disposed for urging said non-rotatable gas bearing face surface axially away from said rotatable gas bearing face surface and circumscribed about said centerline axis, and
   said rotatable engine member being a rotor disk having turbine blades mounted on a rim thereof.

5. A gas turbine engine aspirating face seal comprising:
   a rotatable engine member and a non-rotatable engine member and a leakage path therebetween,
   an annular generally planar non-rotatable gas bearing face surface operably associated with said non-rotatable engine member,
   an annular generally planar rotatable gas bearing face surface operably associated with said rotatable engine member,
   said non-rotatable and rotatable gas bearing face surfaces being circumscribed about and generally perpendicular to a centerline axis,
   a substantially fully annular pull off biasing means operably disposed for urging said non-rotatable gas bearing face surface axially away from said rotatable gas bearing face surface and circumscribed about said centerline axis, and
   wherein said rotatable engine member is a side plate mounted on a rotor disk and said non-rotatable gas bearing face surface is on a face seal ring mounted on a translatable cylindrical piston which is axially movable and supported by said non-rotatable engine member.

6. A seal as claimed in claim 5 wherein said pull off biasing means includes at least one wave spring or one belleville washer.

7. A seal as claimed in claim 6 further comprising an auxiliary seal having a restrictor tooth radially spaced apart from and proximate to a seal land disposed between said rotatable engine member and said non-rotatable engine member.

8. A seal as claimed in claim 6 further comprising an auxiliary seal disposed across said leakage path radially inwardly of said gas bearing face surfaces, said auxiliary seal comprising an annular restrictor tooth radially spaced apart from and proximate to an annular seal land having an annular auxiliary seal surface circumscribed around said engine centerline axis.

9. A gas turbine engine aspirating face seal comprising:

a rotatable engine member and a non-rotatable engine member and a leakage path therebetween, an annular generally planar non-rotatable gas bearing face surface operably associated with said non-rotatable engine member, an annular generally planar rotatable gas bearing face surface operably associated with said rotatable engine member, said non-rotatable and rotatable gas bearing face surfaces being circumscribed about and generally perpendicular to a centerline axis, a substantially fully annular pull off biasing means operably disposed for urging said non-rotatable gas bearing face surface axially away from said rotatable gas bearing face surface and circumscribed about said centerline axis, radially inner and outer tooth rings axially extending away from a first one of said gas bearing face surfaces across said leakage path and towards a second one of said gas bearing face surfaces, and an annular plenum located between said inner and outer tooth rings and a portion of said first gas bearing face surface between said inner and outer tooth rings.

10. A seal as claimed in claim 9 wherein said pull off biasing means includes at least one wave spring or one belleville washer.

11. A seal as claimed in claim 10 wherein said non-rotatable gas bearing face surface is on a face seal ring mounted on a translatable cylindrical piston which is axially movable and supported by said non-rotatable engine member.

12. A seal as claimed in claim 11 wherein said spring chamber is formed in part by radially extending static and axially movable flanges attached to a face seal support structure and said translatable cylindrical piston respectively wherein said face seal support structure is supported by said non-rotatable engine member.

13. A gas turbine engine aspirating face seal comprising:

a rotatable engine member and a non-rotatable engine member and a leakage path therebetween, an annular generally planar non-rotatable gas bearing face surface operably associated with said non-rotatable engine member, an annular generally planar rotatable gas bearing face surface operably associated with said rotatable engine member, said non-rotatable and rotatable gas bearing face surfaces being circumscribed about and generally perpendicular to a centerline axis, a substantially fully annular pull off biasing means operably disposed for urging said non-rotatable gas bearing face surface axially away from said rotatable gas bearing face surface and circumscribed about said centerline axis, and a primary restrictor darn radially spaced apart from said non-rotatable gas bearing face surface by an annular vent channel.

14. A seal as claimed in claim 13 wherein said pull off biasing means includes at least one wave spring or one belleville washer.

15. A seal as claimed in claim 14 wherein said non-rotatable gas bearing face surface is on a face seal ring mounted on a translatable cylindrical piston which is axially movable and supported by said non-rotatable engine member.

16. A seal as claimed in claim 15 wherein said at least one wave spring or one belleville washer is disposed within a continuous annular spring chamber formed in part by radially extending static and axially movable flanges attached to a face seal support structure and said translatable cylindrical piston respectively wherein said face seal support structure is supported by said non-rotatable engine member.

17. A seal as claimed in claim 16 further comprising an auxiliary seal having a restrictor tooth radially spaced apart from and proximate to a seal land disposed between said rotatable engine member and said non-rotatable engine member.

18. A seal as claimed in claim 16 further comprising an auxiliary seal disposed across said leakage path radially inwardly of said gas bearing face surfaces, said auxiliary seal comprising an annular restrictor tooth radially spaced apart from and proximate to an annular seal land having an annular auxiliary seal surface circumscribed around said engine centerline axis.

* * * * *

UNITED STATES PATENT AND TRADEMARK OFFICE
CERTIFICATE OF CORRECTION

PATENT NO. : 6,758,477 B2  
DATED : July 6, 2004  
INVENTOR(S) : John C. Brauer et al.

It is certified that error appears in the above-identified patent and that said Letters Patent is hereby corrected as shown below:

Column 8,  
Line 4, please add -- said -- between "wherein" and "non-rotatable".

Column 10,  
Line 18, please change "darn" to -- dam --.

Signed and Sealed this

Seventh Day of September, 2004

JON W. DUDAS  
*Director of the United States Patent and Trademark Office*